US005721379A

United States Patent [19]

Palmer et al.

[11] Patent Number: 5,721,379

[45] Date of Patent: Feb. 24, 1998

[54] ELECTROMAGNETIC ACOUSTIC TRANSDUCERS

[75] Inventors: Stuart B. Palmer, Warwickshire; Christopher Edwards, Coventry, both of England; Adil Al-Kassim, Svendborg, Denmark

[73] Assignee: The University of Warwick, Coventry, England

[21] Appl. No.: 646,237

[22] PCT Filed: Nov. 14, 1994

[86] PCT No.: PCT/GB94/02505

§ 371 Date: Jun. 24, 1996

§ 102(e) Date: Jun. 24, 1996

[87] PCT Pub. No.: WO95/14363

PCT Pub. Date: May 26, 1995

[30] Foreign Application Priority Data

Nov. 13, 1993 [GB] United Kingdom .................... 9323482

[51] Int. Cl.$^6$ .................... G01N 29/04

[52] U.S. Cl. .................... 75/643

[58] Field of Search .................... 73/643; 336/30

[56] References Cited

U.S. PATENT DOCUMENTS

| | | | |
|---|---|---|---|
| 3,786,672 | 1/1974 | Gaertner | 73/643 |
| 4,395,913 | 8/1983 | Peterson | 73/643 |
| 4,408,493 | 10/1983 | Peterson | 73/643 |
| 4,434,663 | 3/1984 | Peterson | 73/643 |
| 4,777,824 | 10/1988 | Alers et al. | 73/643 |
| 5,164,921 | 11/1992 | Graff | 73/643 |
| 5,271,274 | 12/1993 | Khuri-Yakub | 73/643 |
| 5,537,876 | 7/1996 | Davidson | 73/643 |
| 5,566,573 | 10/1996 | Yost | 73/643 |

FOREIGN PATENT DOCUMENTS

| | | |
|---|---|---|
| 1 524 955 | 9/1978 | United Kingdom . |
| 2 060 127 | 4/1981 | United Kingdom . |

*Primary Examiner*—Christine K. Oda
*Attorney, Agent, or Firm*—Leydig, Voit & Mayer, Ltd.

[57] ABSTRACT

An electromagnetic acoustic transducer for generating ultrasound waves in an electrically conducting sample comprises a magnetic element for producing a static magnetic field, and a coil through which brief current pulses are passed to create a dynamic magnetic field, the interaction between the fields and the sample generating ultrasound waves. The current pulses are produced by an input circuit, and their characteristics are arranged so that the frequency content of the ultrasound generated is broadband. Output pulses produced as a result of the input pulses are then also brief (substantially the same duration as the input pulses) so that accurate measurement of the interval between one output pulse and the next is relatively easy. The transducer can therefore be used to measure accurately the thickness of very thin samples, and to detect near surface defects. The generating transducer may also be used for detection of the output pulses, or a similar but separate detecting transducer may be used.

18 Claims, 2 Drawing Sheets

ELECTROMAGNETIC ACOUSTIC TRANSDUCERS

This invention relates to electromagnetic acoustic transducers.

Such transducers are used for generating and detecting ultrasound waves, for example shear waves, where the vibration direction is parallel to the wavefront. The transducers can generate acoustic waves in an electrically conducting sample without needing to be in contact with it or an acoustic couplant liquid, and so can be used to measure the thickness or surface properties of the sample.

An electromagnetic acoustic transducer normally has a permanent magnet or electromagnet, to create a static magnetic field, and a coil wound perpendicular to the static field direction. If an input current is pulsed through the coil when the transducer is close to a conductor, an eddy current is induced. A Lorentz force interaction between the eddy current and the static magnetic field results in a dynamic stress in a direction mutually perpendicular to the directions of the static field and eddy current. The dynamic stress acts as an ultrasound source. The transducer can also act as a detector of ultrasound waves vibrating predominantly in the same direction as the dynamic stress. In this case the ultrasound wave interacts with the static field to produce an eddy current which creates a dynamic magnetic field which in turn induces output current pulses in a transducer coil; either that of the original transducer, or a separate transducer. The input current pulses are created by discharging a capacitor, while the output pulses are passed via a preamplifier to a recorder such as an oscilloscope.

Electromagnetic acoustic transducers are normally operated in a resonant mode, at relatively low frequencies, below 4 MHz. The frequency is chosen in accordance with the material of the sample being investigated. The generating transducer is driven with a toneburst current, and any separate detecting transducer is tuned to the same frequency as the generating transducer. This arrangement has a good signal-to-noise ratio, but has the disadvantage that the ultrasound waves, and the output current pulses are long and resonant. The resonant detecting transducer further increases the pulse length. It is then difficult to measure accurately the time between one output pulse and the next, so that accurate measurement of the thickness of very thin samples, or detection of some near surface defects, is virtually impossible.

According to a first aspect of the present invention, an electromagnetic acoustic transducer for generating ultrasound waves in an electrically conducting sample comprises magnet means for producing a static magnetic field, and a coil through which brief current pulses are passed to create a dynamic magnetic field, with input means for producing the brief current pulses, the interaction between the fields and the conducting sample generating ultrasound waves, the arrangement being such that the frequency content of the ultrasound generated is broadband, and is determined by the characteristics of the current pulses.

It will be appreciated that a transducer able to operate over a broad band of frequencies is not tuned, and it has been found, quite surprisingly, that it operates satisfactorily. The advantage of the transducer is that the output pulses produced are also brief, being substantially of the same duration as the input pulses, so that it is relatively easy to measure accurately the interval between one pulse and the next. This makes it possible to measure accurately the thickness of very thin samples, and to detect near surface defects.

The frequency content of the ultrasound ranges from DC to 20 MHz. It may be varied by altering the characteristics of the input current pulses. The rise time of the input current pulses is preferably less than 100 nanoseconds. The current may be of the order of 50 amps.

The input pulses may be generated in an input circuit having a high voltage DC supply charging a capacitor through a resistor, the discharge of the capacitor to the coil being controlled by a fast switch. The coil has a low inductance, and the inductance, capacitance and resistance characteristics of the circuit determine the magnitude and form of the pulse. The duration of the pulse determines the frequency content of the ultrasound waves. The fast switch may be an NPN transistor acting in avalanche mode, or a high voltage MOSFET (metal oxide semiconductor field effect transistor), or even a spark gap.

Ultrasound generated by the transducer is preferably detected by a similar transducer, whose coil detects output current pulses created by a dynamic magnetic field produced by the interaction of the ultrasound waves with the static magnetic field, the output current pulses being fed to output means including a preamplifier, operating over a similar range of frequency. The amplifier is preferably low noise, and of the fast recovery type. Such a preamplifier is able to resolve the output current pulses without distortion, thus providing for accurate measurement. The output means may also be provided with means for limiting the voltage applied across the preamplifier input, to protect it from large electromagnetic interference pulses caused by the input pulses passing through the coil. This also ensures that the preamplifier has fast recovery. The limiting means depends on the protection required, but may comprise a filter, or back to back ultrafast silicon diodes.

The generating transducer may also be used for detection, or a separate detecting transducer may be provided.

According to a second aspect of the present invention, an electromagnetic acoustic transducer system for generating and detecting ultrasound waves in an electrically conducting sample comprises a generating transducer in the form of a magnet means producing a static magnetic field, and a coil through which brief input current pulses are passed to produce a dynamic magnetic field, the interaction between the fields and the sample generating ultrasound waves, an input circuit for creating the input current pulses having a power source charging a capacitor through a resistor, and a switch for discharging the capacitor through the generating coil, a detecting transducer having a magnet means producing a static magnetic field and a coil for detecting output current pulses created by a dynamic field produced by the interaction of the ultrasound waves with the static detecting field and an output circuit to which the output pulses from the detecting coil are fed, the output circuit incorporating a preamplifier, in which the characteristics of the input pulses determine a broadband frequency content of the ultrasound generated, the preamplifier is compatible with the bandwidth of the ultrasound generated and the output circuit has limiting means for limiting the voltage applied across the preamplifier.

The generating transducer may also operate as the detecting transducer. Alternatively a separate detecting transducer may be provided.

Embodiments of both aspects of the invention are illustrated by way of example only, in the accompanying drawings, in which.

Figure 1:
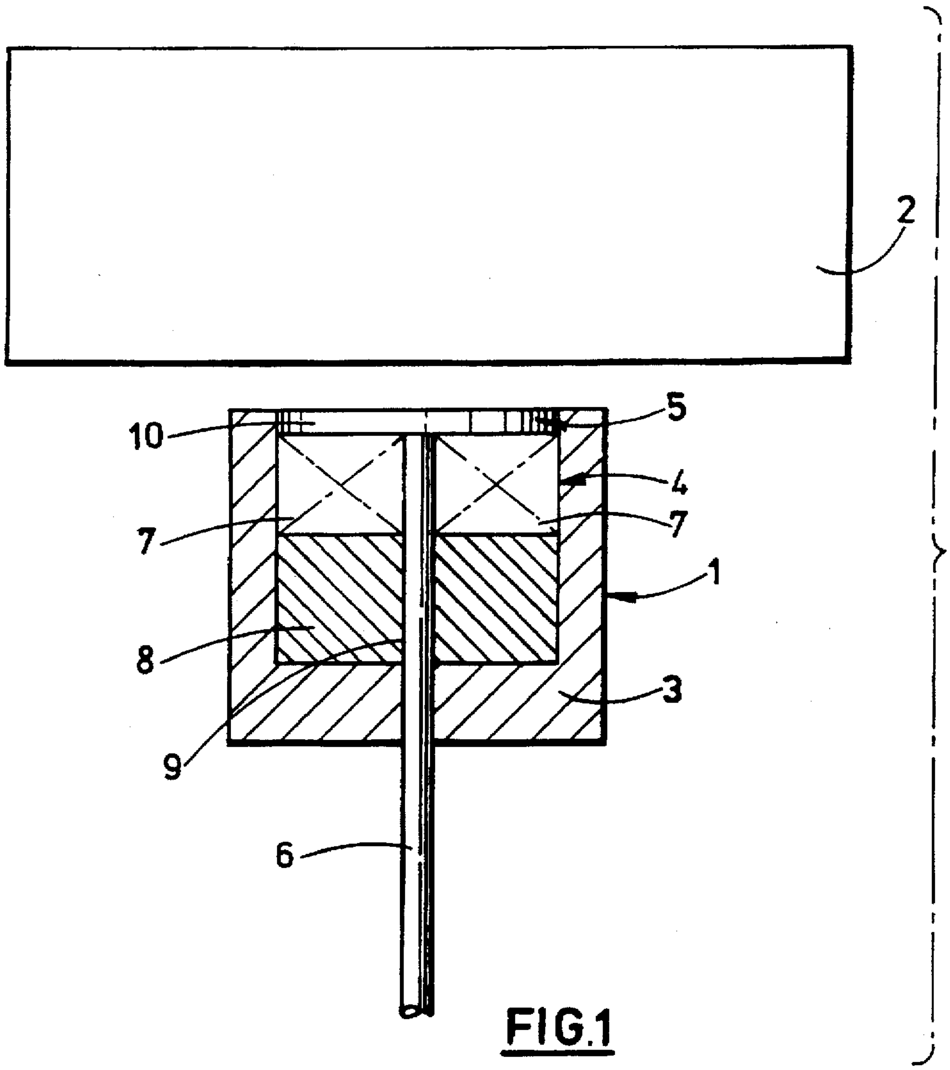
FIG. 1 is a diagrammatic cross-section through an electromagnetic acoustic transducer for generating and/or detecting ultrasound waves.

The electromagnetic acoustic transducer (or EMAT) 1 shown in FIG. 1 generates and/or detects in an electrically conducting sample 2 broadband radially polarized SH shear waves, of the kind in which the vibration direction is parallel to the wavefront. The transducer 1 does not need to be in contact with the sample 2.

The transducer 1 has an open-ended housing 3 of non-ferrous metal, in which is located permanent magnet means 4 to provide an axially directed static magnetic field, and a coil 5 at the open end of the magnet means 4, brief current pulses being supplied to the coil 5 through a cable 6 to produce a dynamic electromagnetic field. The magnet means 4 comprises a pair of neodymium-iron-boron rectangular magnets 7 placed side by side, but spaced apart to allow passage of the cable 6. They are arranged with their polarity in the same direction—axially or normal to the sample 2. The magnets 7 are backed by a ferromagnetic steel plate 8, which has an aperture 9 to allow passage of the cable 6. The plate 8 reduces the self-demagnetising effect of the magnets 7, and increases the static field in the axial direction. In a modification (not shown) the magnet means 4 may be a single magnet with a hole. The coil 5 is of flat spiral form, being etched onto a copper printed circuit board 10, or alternatively wound cooper wire, and is arranged to have a low inductance. The cable 6 is coaxial, while the non-ferrous housing 3 provides electromagnetic shielding as well as mechanical protection for the components.

The transducer 1 operates to generate or detect ultrasound waves in the sample 2. For generation, brief input current pulses, from an input circuit (not shown in FIG. 1), are passed through the coil 5, and these set up corresponding eddy currents in the surface of the sample. There is then a Lorentz force interaction between the static field from the magnets 7 and the eddy currents, to produce the radially polarised ultrasound shear SH waves. In a non-ferrous magnetic sample this is the only way of generating the ultrasound waves. However, in a ferromagnetic sample, more powerful magnetostrictive and magnetic boundary mechanisms may also occur. In the former case, the dynamic magnetic field created by the current pulses passing through the coil 5 causes a redistribution of magnetic domains in the surface of the sample 2, and a change of shape which produces the ultrasound waves. In the latter case surface forces due to the difference in magnetic boundary conditions between the air and the sample create the ultrasound waves. The transducer 1 works in reverse to detect ultrasound waves, with the induced output current pulses appearing in the coil 5 being processed by a suitable device (not shown in FIG. 1).

The transducer 1 is designed to operate over a broad band of ultrasound frequency, rather than being tuned to a particular resonant frequency for use with a given material. Quite surprisingly, it has been found that the transducer 1 operates satisfactorily, and has the advantage that the output current pulses are also of brief duration, so that it is easy to measure the time interval between one pulse and the next.

Figure 2:
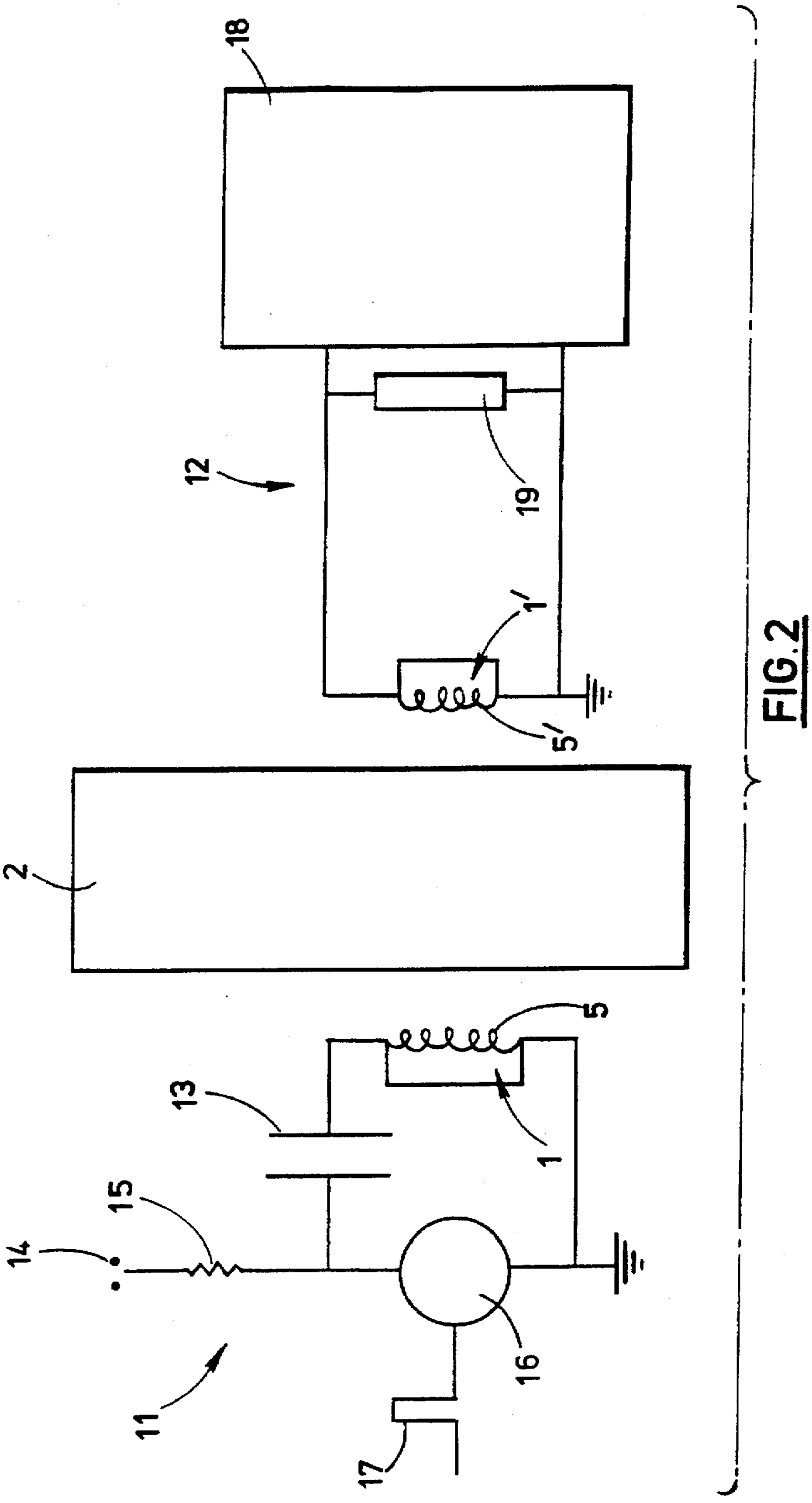
FIG. 2 is a schematic circuit diagram for an electromagnetic acoustic transducer generating and detecting system.

FIG. 2 shows an ultrasound generating and detecting system using two transducers 1, 1' and incorporating appropriate input and output circuits 11, 12 respectively. The static magnetic fields of the transducers are arranged to reinforce each other.

Figure 3:
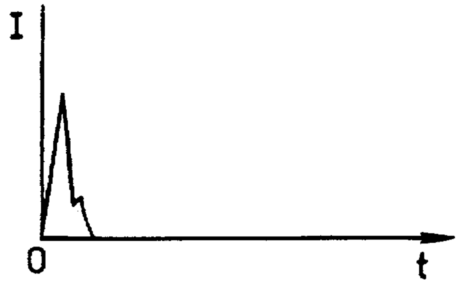
FIG. 3 is a sketch showing the form of an input current pulse.

The generating transducer 1 is incorporated in the input circuit 11, with its coil 5 being connected to a high voltage capacitor 13 which is discharged to create the brief current pulses in the coil 5. The capacitor 13 is charged from a high voltage DC supply 14 through a resistor 15 to limit the current supplied. Discharge of the capacitor 13 is controlled by a fast switch 16 operated by a trigger pulse 17 produced by suitable means (not shown). The switch 16 is an NPN transistor acting in avalanche mode. Alternatively it may be a high voltage MOSFET, or even a spark gap. The magnitude and form of the current pulse passing through the coil 5 is determined by the inductance, capacitance and resistance characteristics of the input circuit. A typical pulse is shown in FIG. 3; the pulse rise time is arranged to be less than 100 ns (nanoseconds). The frequency content of the ultrasound generated is inversely related to the pulse rise time. The current and repetition rate of the pulses depends on the switch 16; in the embodiment shown the maximum current that the switch 16 can withstand is about 50 amps, at a repetition rate of 10kHz. Higher currents may be used by putting several switches 16 in parallel.

The detector transducer 1' is incorporated in the output circuit 12, and located on the opposite side of the sample 2 from the input circuit 11. The coil 5' of the transducer 1' is connected to a broad band fast recovery preamplifier 18, which in turn is connected to an oscilloscope (not shown) for display of the output current pulses. The preamplifier 18 has a bandwidth of 50 kHz to 20 MHz, and a gain of 55 dB. The input and output impedances are respectively—100 and 50 ohms. The output circuit 12 also incorporates limiting means 19 to limit the voltage applied across the preamplifier 18. This is necessary as the input current pulses in the generating coil 5 create large electromagnetic interference pulses which can paralyse the preamplifier 18 for several microseconds. The limiting means 19 comprises back to back ultrafast silicon diodes.

Figure 4:
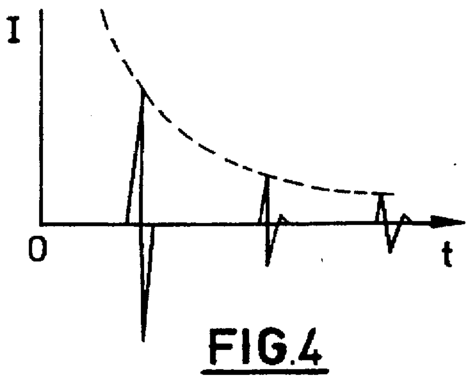
FIG. 4 shows typical output current pulses.

FIG. 4 shows typical output pulses, that is, the form of the detected ultrasound, from the arrangement of FIG. 2, where the thickness of the sample 2 is being measured. It will be appreciated that the form of the output pulses makes it easy to measure the time interval between two successive pulses, thus enabling an accurate calculation of the thickness of the sample 2 to be made.

Various modifications (not shown) of the system shown in FIG. 2 may be made. For example, in some instances, the sample 2 screens the detector transducer 1' and the output circuit 12 from the higher frequency part of the interference pulses caused by the input pulses, although the low frequencies may still reach the detector. In this case, the limiting means 19 may comprise a high pass filter. The bandwidth of the preamplifer 18 would then typically be 1 to 20 MHz.

In another modification, the generating transducer 1 may also be used to detect the output pulses. The transducer 1' is then omitted, and the preamplifier 18 is connected across the coil 5 by a quarter wave line so that the input voltage does not appear directly on the preamplifier input. The preamplifier 18 may also be gated, so that it is turned on about 1 microsecond after an input pulse is passed through the coil 5, and the interference pulse has died away.

In a further modification, the generating transducer 1 is provided with a second coil acting as the detector coil. The second coil is etched or wound concentrically with the generating coil 5, and is connected to the preamplifier 18, with suitable limiting means 19. In fact, as the input voltage does not appear directly across the second coil, it is easier to protect the preamplifier 19. A third or balance coil may be incorporated, to cancel any effect from the interference pulse. The balance coil is spaced from the sample so that it does not affect the detection of the ultrasonic waves.

Any of these arrangements may be incorporated in a battery-powered adapter for connection to a standard ultrasonic flaw detector. This enables the flaw detector, whose output is usually too low for EMAT operation, to use the transducer. The standard flaw detector produces a high voltage output which acts as the trigger pulse for the input circuit 11. The output from the output circuit 12 is applied to the flaw detector, enabling the transducer signal to be synchronised in and displayed on the flaw detector.

FIG. 2 shows the use of the transducers 1 in a system for non-contact measurement of the thickness of a sample 2. Because of its accuracy, it is suitable for measuring thicknesses down to 0.25 mm. The transducers may also be used to detect defects, for example in metal/adhesive bonds of the type used in the aerospace and automotive industries. As the ultrasound waves generated vibrate parallel to the sample surface, they are more sensitive then longitudinal waves to imperfections in a metal/adhesive bond. Measurements could also be made on hot or moving components. In particular, thickness measurements can be made on hot metal tanks containing liquids at high temperatures. Although the magnets 7 must be kept below 100° C., they could simply be water-cooled in a hot environment. Alternatively, higher temperature magnets or pulsed electromagnets could be used.

A further area of use of the transducers is in detecting preferred orientation and internal stresses in metal samples, as the waves generated are particularly sensitive to these. The generating transducer produces a radially polarized shear SH wave which, in an isotropic metal having randomly orientated grains, remains radially symmetrical. However, metals which have been formed, by rolling or extruding for example, have preferred alignment of grains, so behave anisotropically, usually orthotropically. In such metals, the wave produced by the transducer is steered into two orthogonal directions with different shear wave velocities. Because of the broadband nature of the systems, the small amount of shear wave splitting can be resolved. As grain alignment affects the mechanical properties of a metal, the transducers could be used in a quality control system. Internal or applied stresses in metals also have the effect of splitting the shear waves into two components, so that the transducers could be used to measure stress levels in metals. The shear waves also produce a mode-converted longitudinal wave on reflection, so that longitudinal velocity can also be measured.

It will be appreciated that for any particular application, the arrangement of the generating and detecting transducers will be chosen according to the type of measurements required.

We claim:

1. An electromagnetic acoustic transducer for generating ultrasound waves in an electrically conducting sample comprising magnet means for producing a static magnetic field, and a coil, through which brief current pulses are passed to create a dynamic magnetic field, with input means for producing said brief current pulses, the interaction between said fields and said conducting sample generating ultrasound waves, and wherein the frequency content of the ultrasound generated is broadband ranging from DC to 2 MHz, and is determined by the characteristics of said current pulses.

2. An electromagnetic acoustic transducer according to claim 1, wherein said range of ultrasound frequency is varied by altering the characteristic of said input current pulses.

3. An electromagnetic acoustic transducer according to claim 1, wherein the rise time of said input current pulses is less than 100 nanoseconds.

4. An electromagnetic acoustic transducer according to claim 1, wherein said input means comprises an input circuit having a high voltage DC supply charging a capacitor through a resistor, the discharge of said capacitor to said coil being controlled by a fast switch.

5. An electromagnetic acoustic transducer according to claim 4, wherein said fast switch is an NPN transistor acting in avalanche mode.

6. An electromagnetic acoustic transducer according to claim 4, wherein said fast switch is a high voltage MOSFET.

7. An electromagnetic acoustic transducer according to claim 4, wherein said fast switch is a spark gap.

8. An electromagnetic acoustic transducer for detecting ultrasound waves having a broadband frequency content in an electrically conducting sample comprising magnet means for producing a static magnetic field and a coil for detecting output current pulses created by a dynamic magnetic field produced by the interaction of said ultrasound waves with said static magnetic field and said sample and output means to which the output pulses are fed, wherein said output means includes a preamplifier compatible with the bandwidth of said ultrasound waves and means for limiting the voltage applied across the input of the proamplifier.

9. An electromagnetic acoustic transducer according to claim 8, wherein said limiting means comprises a filter.

10. An electromagnetic acoustic transducer according to claim 8, wherein said limiting means comprise back to back ultrafast silicon diodes.

11. An electromagnetic acoustic transducer system for generating and detecting ultrasound waves in an electrically conducting sample comprising a generating transducer in the form of magnet means producing a static magnetic field, and a coil through which brief input current pulses are passed to produce a dynamic magnetic field, the interaction between said fields and said sample generating ultrasound waves, an input circuit for creating the input current pulses having a power source charging a capacitor through a resistor, and a switch for discharging said capacitor through said generating coil, and a detecting transducer having magnet means producing a static detecting magnetic field and a coil for detecting output current pulses created by a dynamic field produced by the interaction of said ultrasound waves with said static detecting fields and an output circuit to which said output current pulses from said detecting coil are fed, said output circuit incorporating a preamplifier wherein the characteristics of said input pulses determine a broadband frequency content of said ultrasound generated, said preamplifier is compatible with the bandwidth of said ultrasound generated and said output circuit has limiting means for limiting the voltage applied across said preamplifier.

12. An electromagnetic acoustic transducer system according to claim 11, wherein said generating transducer is separate from said detecting transducer.

13. An electromagnetic acoustic transducer system according to claim 12, wherein said limiting means comprises back to back ultrafast silicon diodes.

14. An electromagnetic acoustic transducer system according to claim 12, wherein said limiting means comprises a high pass filter.

15. An electromagnetic acoustic transducer system according to claim 11, wherein said generating transducer also operates as said detecting transducer.

16. An electromagnetic acoustic transducer system according to claim 15, wherein said preamplifier is connected across said coil of said generating transducer by a quarter wave line.

17. An electromagnetic acoustic transducer system according to claim 15, wherein said generating transducer is provided with a second coil acting as said detecting coil and connected to said preamplifier.

18. An electromagnetic acoustic transducer system according to claim 11, wherein said system is incorporated in an adaptor for connection to a standard ultrasonic flaw detector.

* * * * *

UNITED STATES PATENT AND TRADEMARK OFFICE

CERTIFICATE OF CORRECTION

PATENT NO. : 5,721,379
DATED : February 24, 1998
INVENTOR(S) : Palmer et al.

It is certified that error appears in the above-identified patent and that said Letters Patent is hereby corrected as shown below:

Column 5,
Line 49, "2 MHz" should be -- 20 MHz --.

Signed and Sealed this

Thirteenth Day of July, 2004

JON W. DUDAS
*Acting Director of the United States Patent and Trademark Office*